United States Patent
Saund (10) Patent No.: US 8,781,229 B2
(45) Date of Patent: Jul. 15, 2014

(54) SYSTEM AND METHOD FOR LOCALIZING DATA FIELDS ON STRUCTURED AND SEMI-STRUCTURED FORMS

(75) Inventor: Eric Saund, San Carlos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 57 days.

(21) Appl. No.: 13/537,630

(22) Filed: Jun. 29, 2012

(65) Prior Publication Data

US 2014/0003721 A1     Jan. 2, 2014

(51) Int. Cl.
*G06K 9/34*     (2006.01)

(52) U.S. Cl.
USPC .......................... 382/182; 382/173; 382/237

(58) Field of Classification Search
USPC .......................... 382/173, 182, 237; 715/243
See application file for complete search history.

(56) References Cited

U.S. PATENT DOCUMENTS

| | | | |
|---|---|---|---|
| 6,885,769 B2* | 4/2005 | Morita et al. | 382/181 |
| 7,003,166 B2* | 2/2006 | Abhyankar et al. | 382/237 |
| 7,581,177 B1* | 8/2009 | Mollicone et al. | 715/243 |
| 2002/0087382 A1* | 7/2002 | Tiburcio | 705/9 |
| 2007/0036433 A1* | 2/2007 | Teutsch et al. | 382/173 |
| 2011/0293187 A1 | 12/2011 | Sarkar et al. | |
| 2012/0010900 A1* | 1/2012 | Kaniadakis | 705/2 |

* cited by examiner

*Primary Examiner* — Gregory M Desire
(74) *Attorney, Agent, or Firm* — Fay Sharpe LLP (57) ABSTRACT

A method and system to localize data fields of a form. An image of a form is received, where the form includes data fields. Word boxes of the image are identified. The word boxes are grouped into candidate zones, where each of the candidate zones includes one or more of the word boxes. Hypotheses are formed from the data fields and the candidate zones, where each hypothesis assigns one of the candidate zones to one of the data fields or a null data field. A constrained optimization search of the hypotheses is performed for an optimal set of hypotheses. The optimal set of hypotheses assigns word box groups to corresponding data fields.

20 Claims, 12 Drawing Sheets

SYSTEM AND METHOD FOR LOCALIZING DATA FIELDS ON STRUCTURED AND SEMI-STRUCTURED FORMS

BACKGROUND

The present exemplary embodiments disclosed herein relate generally to image processing. They find particular application in conjunction with localizing data fields of forms, and will be described with particular reference thereto. However, it is to be appreciated that the present exemplary embodiments are also amenable to other like applications.

Forms are a type of document that provide pre-defined data fields for entry of data. The spatial organization of data fields facilitates capture of the data in a structured and organized fashion by human and automatic means. In a straightforward case, each data field can be cropped out of an image of the form and run through Optical Character Recognition (OCR) individually. This is called zonal OCR. Zonal OCR works correctly when printed and/or handwritten data is confined to the correct locations on the form, as defined by the boundaries of the data fields. However, zonal OCR fails to work correctly when printed and/or handwritten data is misregistered with respect to the data fields.

Figure 1:
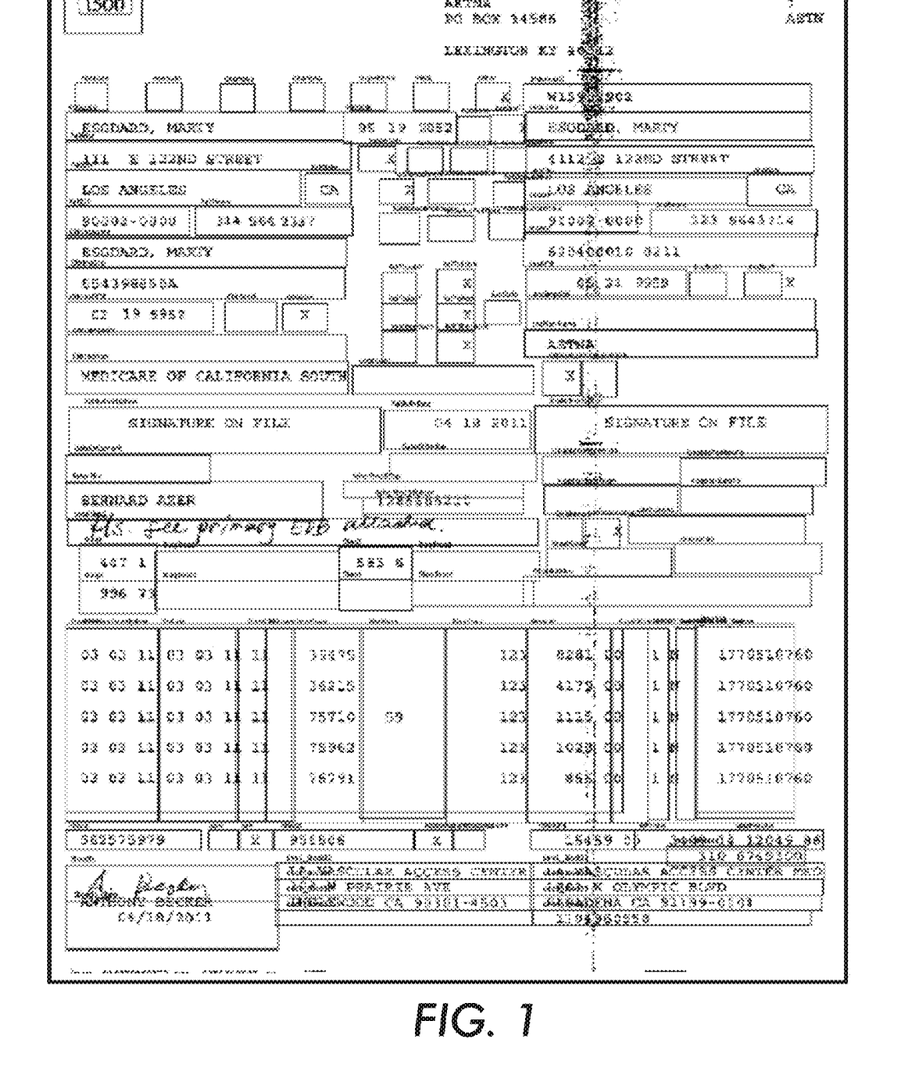
FIG. 1 illustrates a color-dropout form with the background information removed and idealized data fields shown in overlay.
Figure 2:
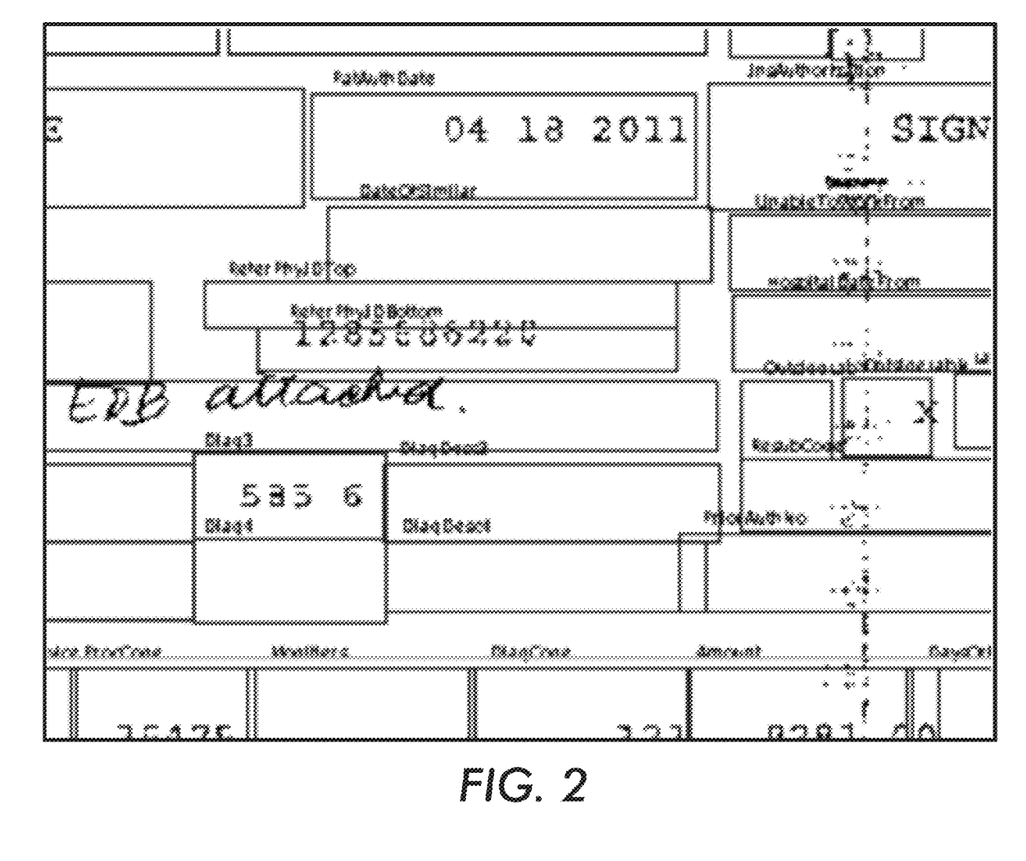
FIG. 2 illustrates a close-up of a region of the color-dropout form of FIG. 1, the close-up showing misregistration of data items.

With reference to FIG. 1, an example of a color-dropout form is provided. As illustrated, all of the background form information has been removed and the only markings scanned are printed and/or handwritten data and image noise. Further, boxes representing the nominal locations and boundaries of the data fields are overlaid on the color-dropout form. Color-dropout forms are convenient because the printed background form information generally cannot be confused with entered data. With reference to FIG. 2, a close-up of a region of the color-dropout form illustrates misregistration between data and data field boundaries.

In view of the foregoing, a challenge with zonal OCR is how to associate printed and/or handwritten data with corresponding data fields even when the data falls outside the delineated boundaries of the data fields. A solution to this challenge would advantageously permit zonal OCR to be applied to regions of the page where the data actually occurs instead of merely where the data is supposed to occur. Known solutions expand the data field boundaries used for zonal OCR. This works satisfactorily as long as the boundary expansion includes the intended data, but does not include data from adjacent fields. However, when data fields are close together and/or data is misregistered, this approach leads to incorrect assignments of data to data fields.

The present application provides new and improved methods and systems which overcome the above-referenced challenges.

INCORPORATION BY REFERENCE

U.S. patent application Ser. No. 13/537,729 for SYSTEM AND METHOD FOR FORMS RECOGNITION BY SYNTHESIZING CORRECTED LOCALIZATIONS OF DATA FIELDS, by Eric Saund, filed on even date herewith, U.S. patent application Ser. No. 12/788,852 for SYSTEM AND METHOD FOR EFFICIENT INTERPRETATION OF IMAGES IN TERMS OF OBJECTS AND THEIR PARTS, by Prateek Sarkar and Evgeniy Bart, filed May 27, 2010, and U.S. patent application Ser. No. 13/022,877 for FINDING REPEATED STRUCTURE FOR DATA EXTRACTION FROM DOCUMENT IMAGES, by Evgeniy Bart, Prateek Sarkar, and Eric Saund, filed on Feb. 8, 2011, are each hereby incorporated herein by reference in entirety.

BRIEF DESCRIPTION

According to one aspect of the present application, a method for localizing data fields of a form is provided. The method, performed by at least one processor, includes receiving an image of a form. The form includes data fields. Word boxes of the image are identified. The word boxes are grouped into candidate zones, where each candidate zone includes one or more of the word boxes. Hypotheses are formed from the data fields and the candidate zones. Each hypothesis assigns one of the candidate zones to one of the data fields or a null data field. A constrained optimization search of the hypotheses is performed for an optimal set of hypotheses. The optimal set of hypotheses assigns word box groups to corresponding data fields.

According to another aspect of the present application, a system for localizing data fields of a form is provided. The system includes at least one processor programmed to receive an image of a form, the form including data fields. Word boxes of the image are identified. The word boxes are grouped into candidate zones, each candidate zone including one or more of the word boxes. Hypotheses are formed from the data fields and the candidate zones. Each hypothesis assigns one of the candidate zones to one of the data fields or a null data field. A constrained optimization search of the hypotheses is performed for an optimal set of hypotheses. The optimal set of hypotheses assigns word box groups to corresponding data fields.

According to another aspect of the present application, a data extraction system includes at least one processor. The processor is programmed to receive an image of a form and a template model of the form, the form including data fields. Word boxes of the image are identified. The word boxes are grouped into candidate zones, where each candidate zone includes one or more of the word boxes. Hypotheses are formed from the data fields and the candidate zones. Each hypothesis assigns one of the candidate zones to one of the data fields or a null data field. For each of the hypotheses, an assignment quality is determined. The assignment quality for each of the hypotheses assigning a candidate zone to one of the data fields is based on a template model of the form. A constrained optimization search of the hypotheses is performed for an optimal set of hypotheses based on assignment quality. The optimal set of hypotheses optimally assign word boxes to corresponding data fields and the hypotheses of the optimal set of hypotheses are non-overlapping in word-box support. Data from the word boxes is extracted and assigned to corresponding data fields based on the optimal set of hypotheses.

DETAILED DESCRIPTION

Figure 3:
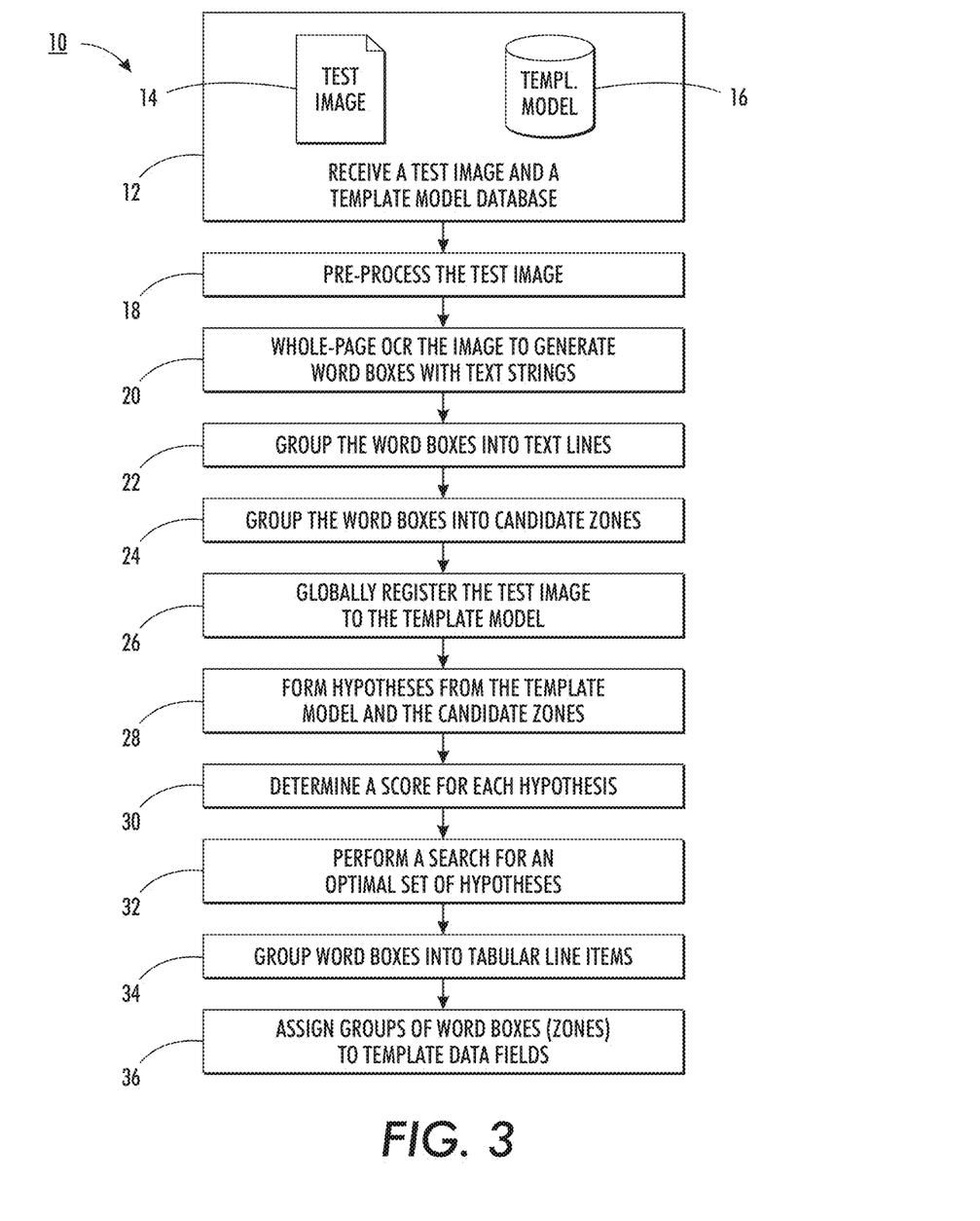
FIG. 3 illustrates a block diagram of a Template Form Parser (TFP) method.

With reference to FIG. 3, a block diagram of a Template Form Parser (TFP) method 10 for locating a printed or handwritten data entry or marking associated with data fields of forms is provided. As will be seen, data can be located even when the data is not entered in correct alignment with the corresponding data fields.

The TFP method 10 includes receiving 12 a test image 14 of a form and a template model 16 of the form. The form includes one or more data fields, typically, a plurality, and a layout specified by the positioning of the data fields on the form. The template model 16 identifies, for each data field of the form, the type of text pattern the data field is expected to contain and the placement, including location and size, of the data field on the form. The form is typically a color-dropout form with the background form information removed, thereby leaving only the data and image noise. However, other types of forms, such as non-color-dropout forms, are also contemplated.

The test image 14 is optionally pre-processed 18 to enhance the test image 14 and/or to assess the quality of the test image 14. Enhancements include, for example, one or more of de-skewing, thresholding, noise cleanup, and the like. The image quality can be employed to trigger further enhancements to the test image 14 and/or to reject the test image 14 from further processing and/or consideration. For example, if the quality level of the test image 14 falls below a predetermined level, the test image 14 can be rejected because it is of such poor quality that further processing would fail or achieve poor localization of the data fields. As another example, if the quality level of the test image 14 falls below a first predetermined level, and optionally exceeds a second predetermined level, the test image 14 can undergo further enhancement. Any of a number of different algorithms, known to those of ordinary skill in the art, can be employed to assess the quality of the test image 14. For example, one method is to count the number of character-size connected components versus noise-size connected components to assess character fragmentation.

Figure 4:
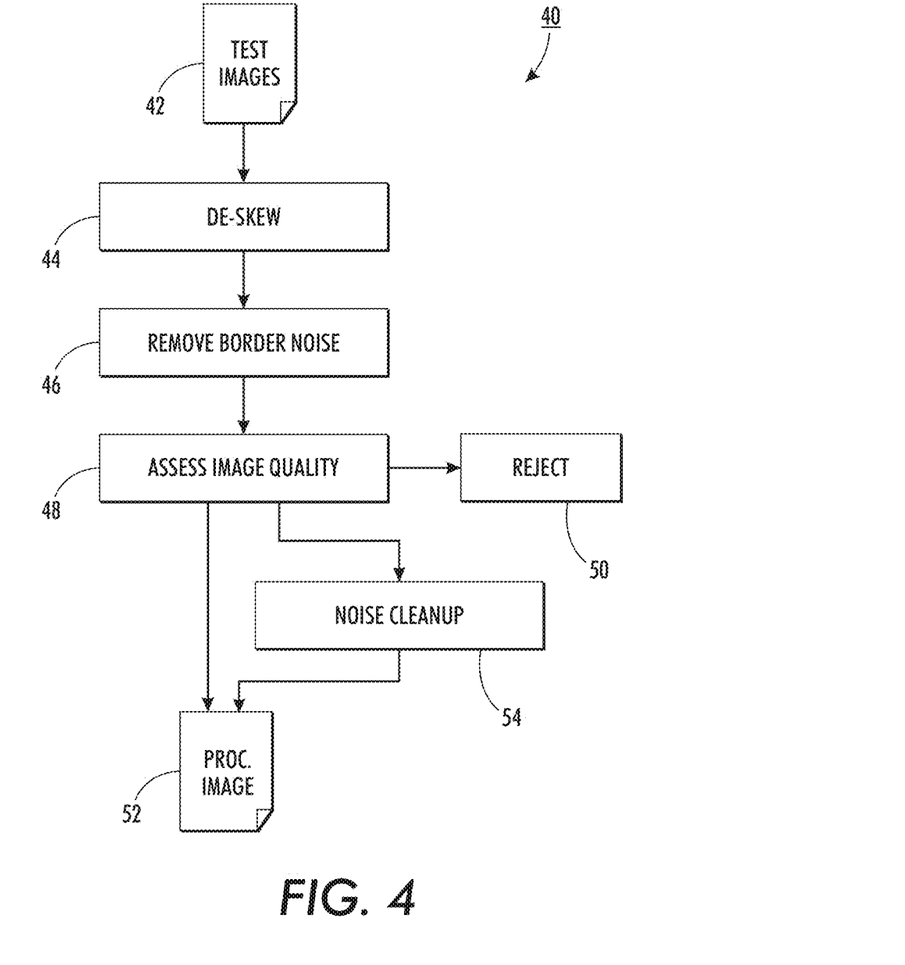
FIG. 4 illustrates a block diagram of a pre-processing method.

With reference to FIG. 4, a block diagram of a pre-processing method 40 that can be employed is provided. The pre-processing method 40 includes receiving a test image 42, such as the test image 14, and de-skewing 44 the test image 42. Border noise is then removed 46 from the de-skewed image. Border noise can be removed by converting the de-skewed image to gray scale, where necessary, and thresholding the de-skewed image to yield a bitonal image. The quality of the thresholded image is then assessed 48. Insofar as the quality falls below a first predetermined level, the thresholded image is rejected 50. For example, faint images are rejected. Insofar as the quality exceeds a second predetermined level, the pre-processing is complete and the thresholded image is the pre-processed image 52. Optionally, insofar as the quality falls between the first predetermined level and the second predetermined level, the thresholded image undergoes noise cleanup 54 to create the pre-processed image 52.

Referring back to FIG. 3, the test image 14, optionally as pre-processed, undergoes whole-page OCR 20 to generate a word box with a text string for each grouping of characters on a common text line. A word box and its associated text string identifies a bounding box for, and the characters of, a grouping of characters. A grouping of characters can be determined according to horizontal (x-axis) and vertical y-axis position of identified characters. For example, a character within a predetermined distance of an adjacent character in both the x-axis and y-axis direction is part of the same group as the adjacent character. Commercially available OCR engines are known which can generate the word boxes.

Figure 5:
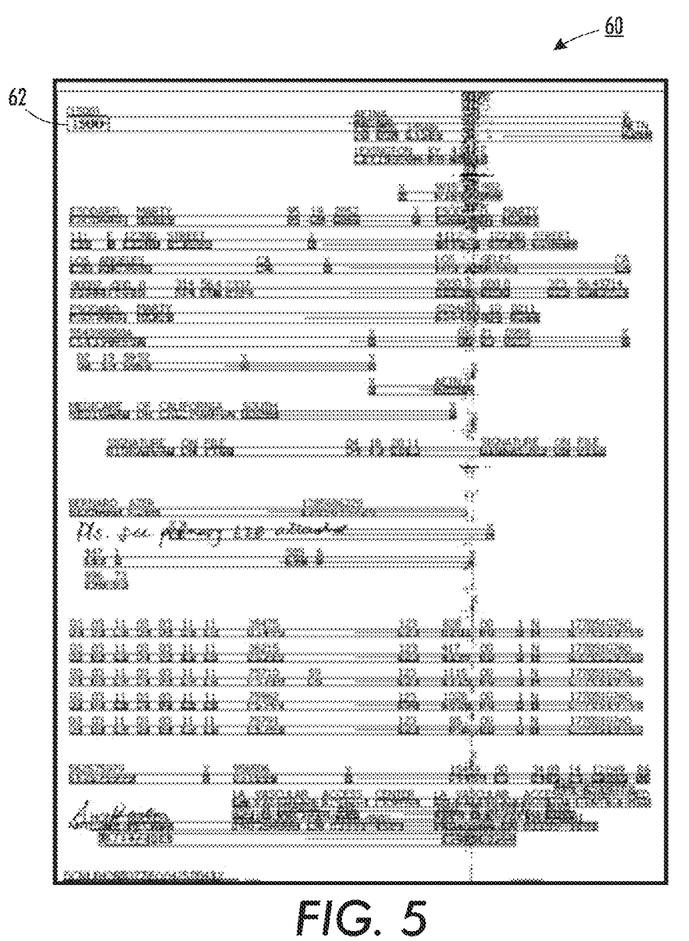
FIG. 5 illustrates an image of a form annotated with text line boundaries.
Figure 6:
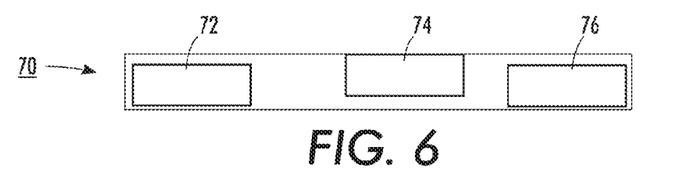
FIG. 6 illustrates a text line and corresponding word boxes.

After generating word boxes, the word boxes are grouped 22 into text lines spanning the full width of the form. In one embodiment, word boxes are grouped by clustering word boxes according to the vertical (y-axis) position. For example, if word boxes are within a predetermined distance of a horizontal line, the word boxes are part of a common text line. With reference to FIG. 5, an example of a test image 60, such as the test image 14, annotated with boundaries 62 of text lines is illustrated. With reference to FIG. 6, an example of a text line 70 and the corresponding word boxes 72, 74, 76 forming the text line 70 is provided.

Referring back to FIG. 3, the word boxes found by OCR of word boxes are grouped 24 into larger groups, called candidate zones, based on their spatial arrangements. The candidate zones need not be mutually exclusive of word boxes and can overlap. In one embodiment, a candidate zone is created for each contiguous sequence of one or more word boxes. A pair of word boxes can be considered contiguous if there are no intervening word boxes between the two word boxes. In other embodiments, candidate zones may be formed from multiple text lines. Each candidate zone is a candidate for assignment to a data field of the form.

Figure 7:
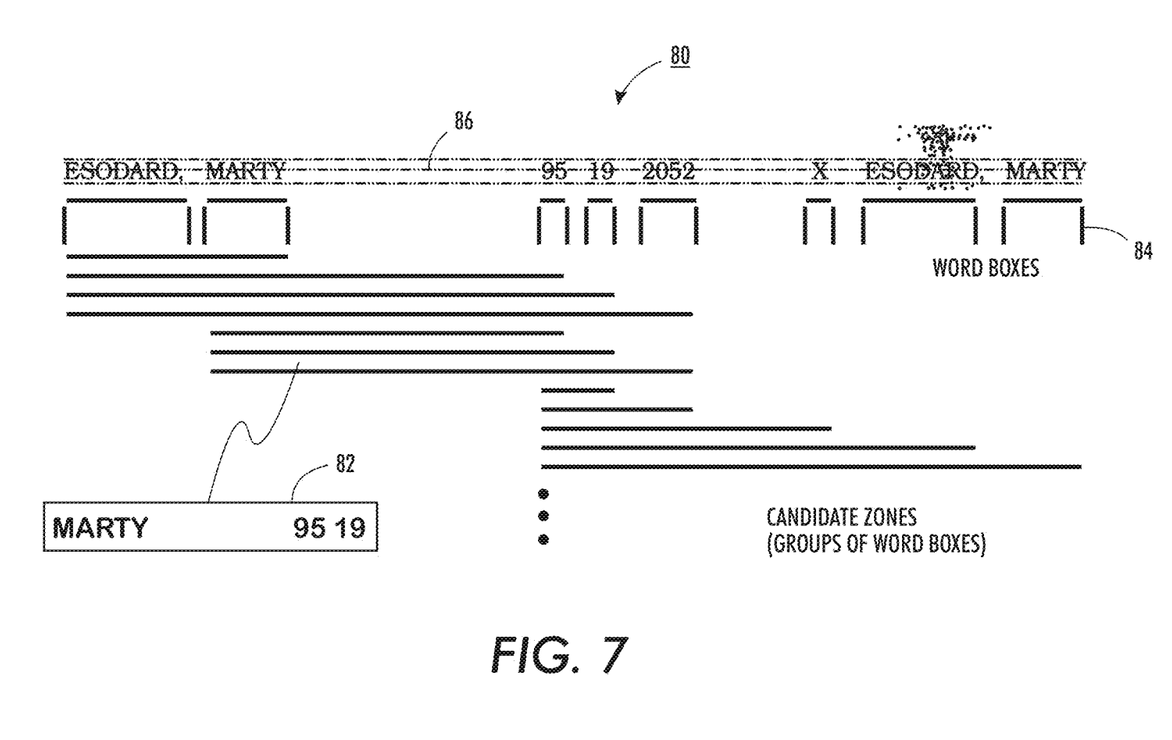
FIG. 7 illustrates a method for constructing candidate zones.

With reference to FIG. 7, a method 80 for constructing candidate zones 82 from word boxes 84 of a text line 86 is graphically illustrated. The method 80 constructs all sets of contiguous word boxes, limited by one or more constraints. Different instantiations of the method 80 may be designed to adopt different constraints. One constraint is the maximum number of word boxes allowed in a candidate zone. Another example constraint is the maximum horizontal (x-axis) gap between successive word boxes.

Referring back to FIG. 3, the test image 14, optionally as preprocessed, can optionally be globally registered 26 with the template model 16. In that regard, one or more points of the test image 14 are mapped to corresponding points in the template model 16. One approach for doing so is discussed hereafter. Assuming a mapping exists between the points of the test image 14 and the template model 16, a global registration map is generated using rigid and/or non-rigid transformations. For example, the registration map can take into account one or more of a translation, a rotation, scaling factors, and the like from the locations of the points. In one embodiment, the placements of the data fields of the template model 16 are adjusted based on the registration map. Alternatively, the test image 14 is distorted to conform to the template model 16 based on the registration map.

Figure 8:
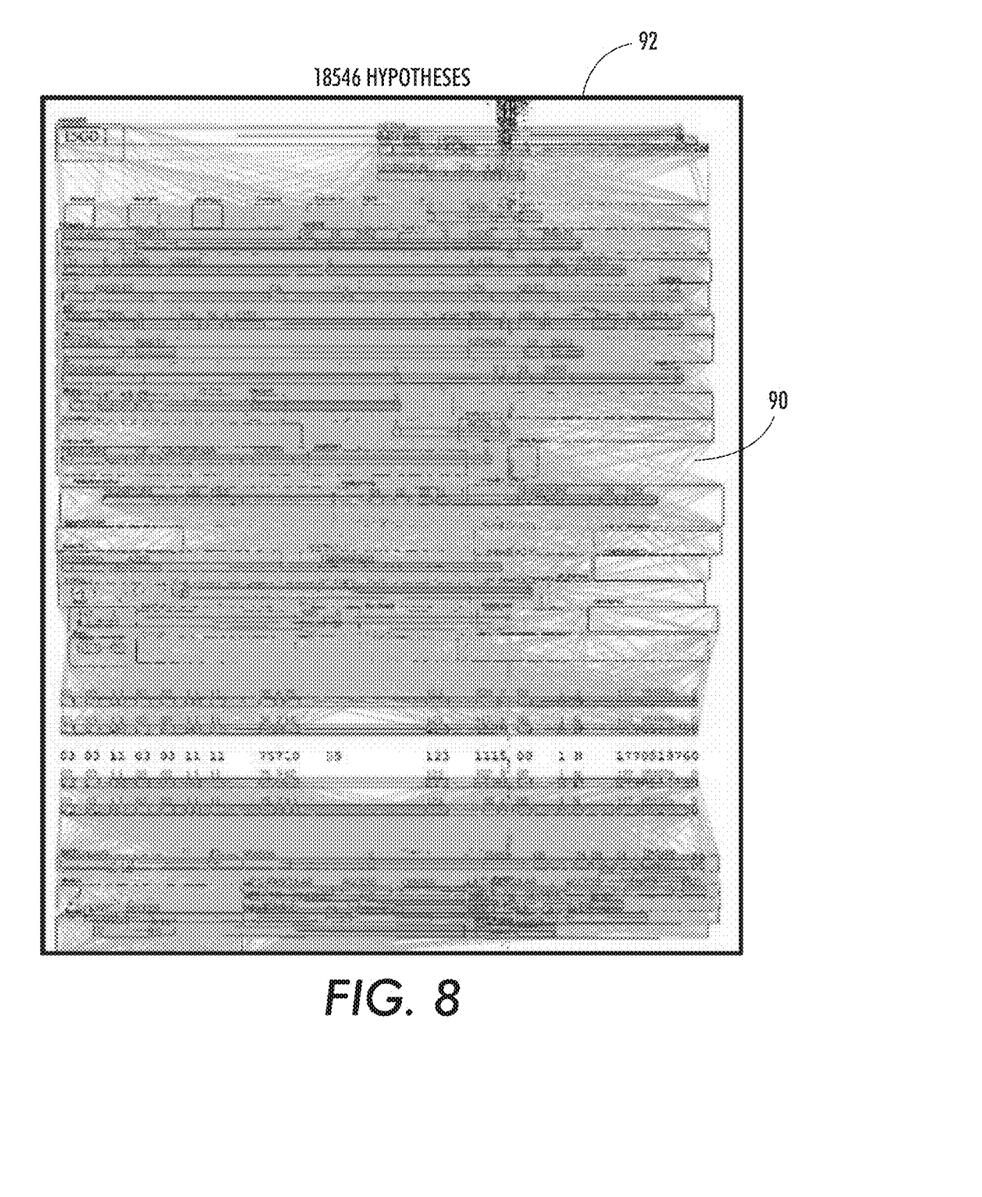
FIG. 8 illustrates a plurality of hypotheses overlaid on an image of a form.
Figure 9A:
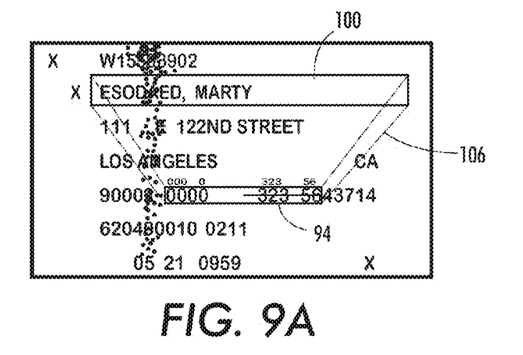
FIGS. 9A-C illustrate enlarged regions of the image of FIG. 8.
Figure 9B:
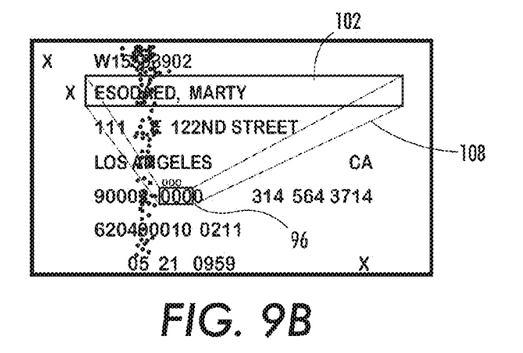
Figure 9C:
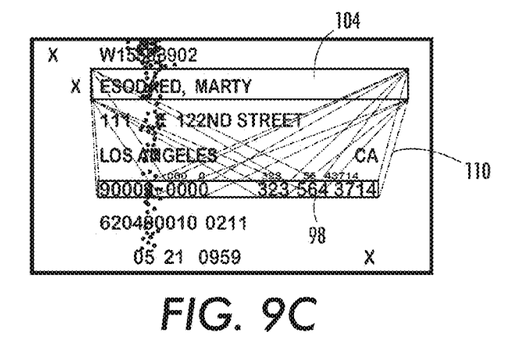

Regardless of global registration, a plurality of zone-candidate/data-field hypotheses are formed 28 for the template model 16. Each hypothesis assigns a candidate zone to a data field of the template model 16 or a null data field (i.e., no data field at all). In some embodiments, the hypotheses are formed exhaustively. In other words, for each combination of candidate zone and data field of the template model 16, a hypothesis mapping the candidate zone to the data field is formed. Further, for each candidate zone, a hypothesis mapping the candidate zone to a null data field is formed. In other embodiments, less exhaustive approaches to forming the hypotheses are employed. For example, the hypothesis scoring factors, discussed hereafter, can be employed to score a possible hypothesis. If the score is less than a predetermined threshold, the hypothesis is not formed. For example, a hypothesis is only formed for a combination of a candidate zone and a data field of the template model 16 when the distance between the candidate zone and the data field is less than a predetermined threshold. As another example, a hypothesis is only formed for a combination of a candidate zone and a data field of the template model 16 when the sizes of the candidate zone and the data field are within a predetermined amount of each other. With reference to FIG. 8, 18,546 hypotheses, including a hypothesis 90, are illustrated as lines overlaid on a test image 92 of a form. With reference to FIGS. 9A-C, regions of the test image 92 are enlarged. Candidate zones 94, 96, 98 are connected to data fields 100, 102, 104 of the form by hypothesis 106, 108, 110.

Referring back to FIG. 3, for each hypothesis, a score-cost of the assignment is determined 30. For each hypothesis with a null data field, the score-cost is the sum of null costs of the constituent word boxes. The null cost of a word box is predetermined by an operator of the TFP method 10 and serves as a bias in favor of assigning candidate zones to data fields. For each hypothesis with an assignment to a data field of the template model 16, the score-cost assesses the likelihood or compatibility of the assignment of the candidate zone to the data field and is based on one or more factors. The factors may include one or more of the following factors:

1) the number of characters in the word boxes of the candidate zone that are not found in a list of characters expected to occur in the data field;

2) the number of characters in the candidate zone minus the maximum number of characters expected to occur in the data field;

3) the vertical overlap proportion of the bounding boxes of the candidate zone and the corresponding data field;

4) the size similarity between the bounding boxes of the candidate zone and the corresponding data field;

5) the horizontal displacement of the lower left corners of the candidate zone and the corresponding data field;

6) the vertical displacement of the lower left corners of the candidate zone and the corresponding data field;

7) the proximity of the leftmost and rightmost word boxes of the candidate zone to word boxes not included in the candidate zone; and, 8) the density of characters in the candidate zone compared to bounding box size of the candidate zone.

In computing a score-cost for a hypothesis with an assignment to a data field of the template model 16, a numeric score-cost is computed for each factor in terms of a cost. In one embodiment, a score of 0.0 indicates perfect compatibility between the candidate zone and the data field, and a score above 0.0 indicates some degree of incompatibility. The score-costs of all factors are summed, so that incompatibility of any of these factors contributes to a score-cost contraindicating the hypothesis. The summation may be weighted to favor factors better indicating incompatability.

After generating the hypotheses, an optimization search is performed 32 for a set of the hypotheses resulting in an optimal assignment of candidate zones to data fields of the template model 16. The set is selected on the basis of two types of constraints, a hard constraint and a soft constraint. The hard constraint, called the nonoverlapping support constraint, is that no candidate zone may be accepted in the final selection of accepted zones if any of its constituent word boxes is a member of any other accepted zone. The soft constraint is that low-score-cost assignments are preferred. The optimal assignment is the set of hypotheses that minimizes the sum of score costs while satisfying the hard constraint. The sum of score costs for an assignment is the sum of the score costs of the hypotheses forming the assignment.

Figure 10:
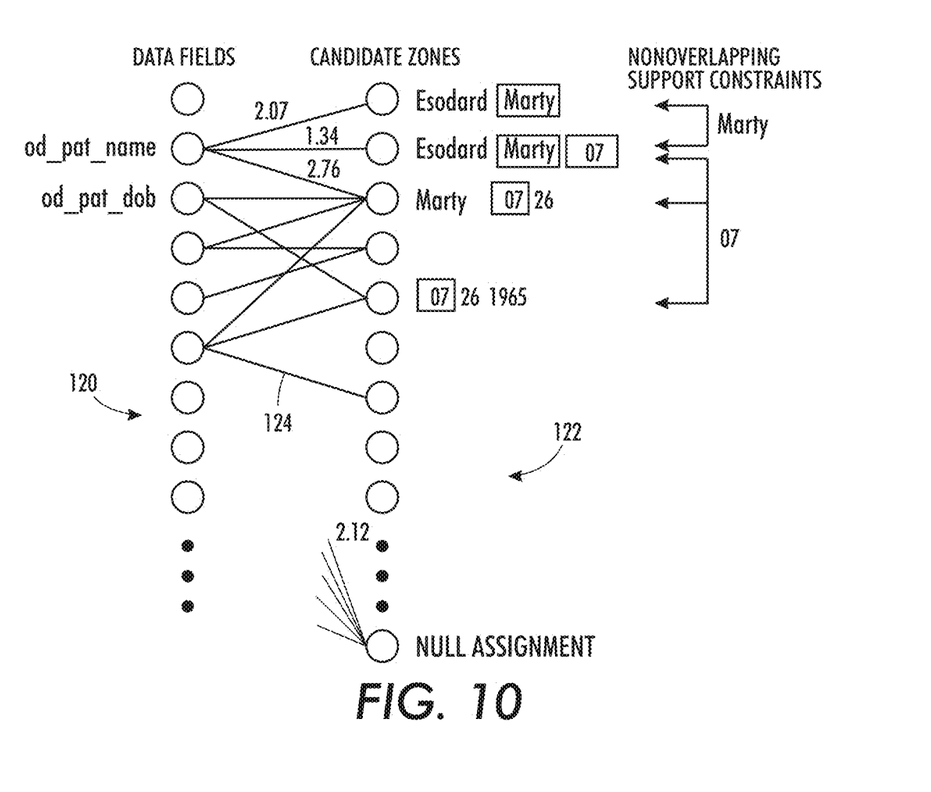
FIG. 10 illustrates an optimization search for a set of optimal hypothesis.

With reference to FIG. 10, the optimization search is illustrated. The left column of nodes 120 corresponds to the data fields of the form and the right column of nodes 122 corresponds to the candidate zones, which are comprised of groups of word boxes. The lines 124 between the nodes correspond to hypotheses and are annotated with the score-costs. As discussed above, the optimization search chooses the set of hypotheses that minimizes the score cost of the set of hypotheses, subject to the hard constraint that accepted zones cannot overlap in their word-box support.

Referring back to FIG. 3, the optimization search in one embodiment is suitably performed using a Best-First-Leaf-Search (BFLS) optimization algorithm. An example of the BFLS search is discussed in U.S. patent application Ser. No. 12/788,852 for SYSTEM AND METHOD FOR EFFICIENT INTERPRETATION OF IMAGES IN TERMS OF OBJECTS AND THEIR PARTS, by Prateek Sarkar and Evgeniy Bart, filed on May 27, 2010, incorporated herein by reference in its entirety. However, other algorithms can perform the optimization search, such as, for example, greedy search, A-star search, linear constraint solver, and the like.

Word boxes can optionally be grouped 34 into tabular line items. Typically, such grouping is performed when the form includes regions of semi-structured data, such as tables and listing of line items. To perform the grouping, data fields belonging to tabular regions are identified based on the location of the data fields on the form with respect to the template model 16. Alternatively, an operator of the TFP method 10 selects the data fields using, for example, a user input device. Thereafter, word boxes of the optimal set of hypotheses corresponding to the identified data fields are processed using a tabular data parsing algorithm to group the word boxes into tabular line items. In one embodiment, the tabular data parsing algorithm is the algorithm of U.S. patent application Ser. No. 13/022,877 for FINDING REPEATED STRUCTURE FOR DATA EXTRACTION FROM DOCUMENT IMAGES, by Evgeniy Bart, Prateek Sarkar, and Eric Saund, filed on Feb. 8, 2011, incorporated herein by reference in its entirety.

Once the optimization search is complete and, where applicable, data is grouped into tabular line items, the text data from accepted zone word boxes is assigned 36 to corresponding data fields. The data can then be stored in to a database and/or used for further processing.

As will be appreciated, the TFP method 10 enables data to be collected from forms even when the printed material is not correctly aligned with the nominal form fields. Alignment problems of this nature are commonly found in high volume production document processing centers. In particular, a known document processing center processes hundreds of thousands of Health Care Finance Administration (HCFA) forms per day and encounters field registration errors on approximately 5% of the images due to misprints by the healthcare provider who printed the form or due to roller slippage or other problems at the scanning stations. By compensating for these misregistrations using the TFP method 10, document processing centers can save time and money on costly human validation and manual key data entry.

Figure 11:
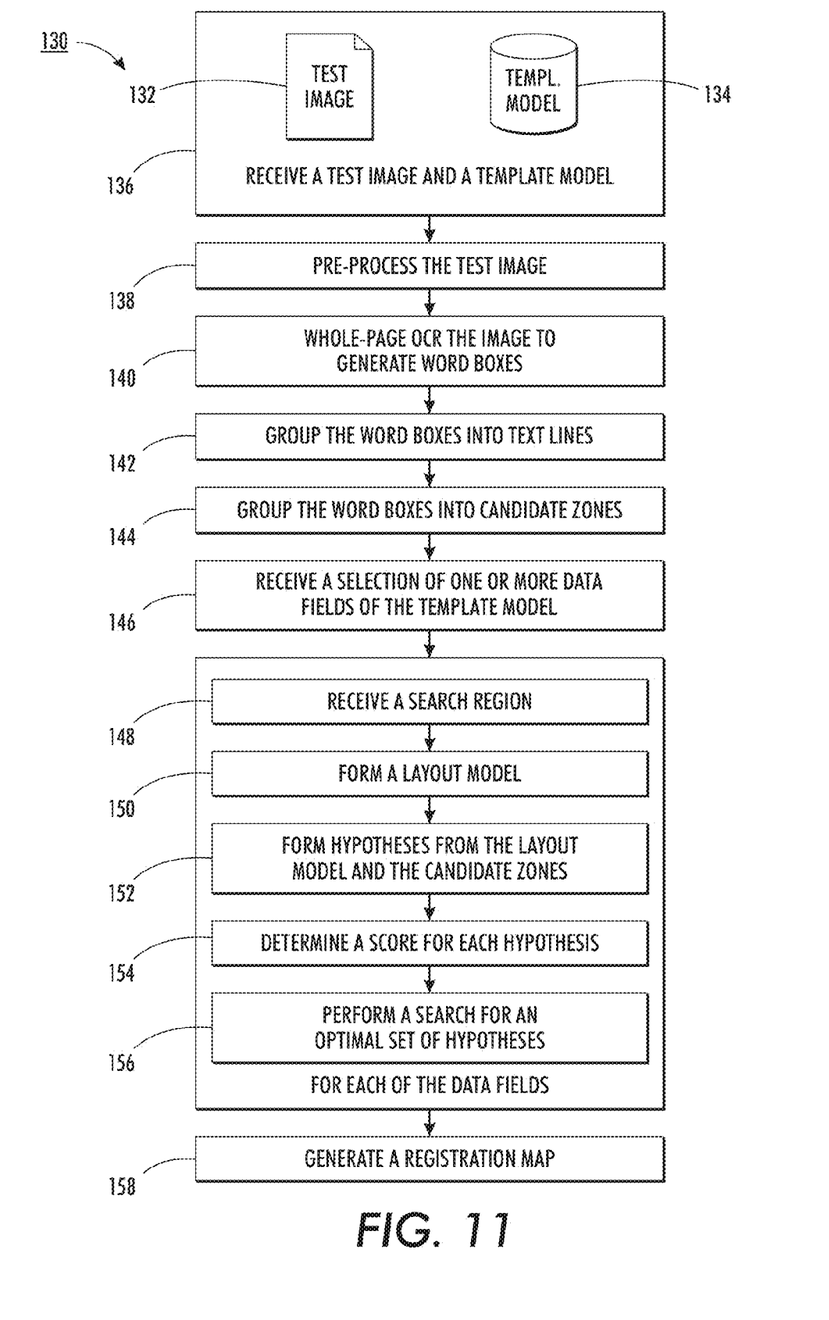
FIG. 11 illustrates a block diagram of a method for assigning data items of a form to data fields of the form.

With reference to FIG. 11, a method 130 for mapping points in a test image 132 of a form, such as the test image 12 of FIG. 3, to a template model 134 of the form, such as the template model 14 of FIG. 3, is provided. The method 130 finds application in connection with the global registration 24 of FIG. 3 and includes receiving 136 the test image 132 and the template model 134. The test image 132 is optionally pre-processed 138 in the same manner as the pre-processing 18 of FIG. 3. The test image 132, as pre-processed where applicable, undergoes whole-page OCR 140 to generate word boxes in the same manner as the whole-page OCR 20 of FIG. 3. The word boxes are then grouped 142 into text lines and grouped 144 into candidate zones in the same manner as the groupings 22, 24 of FIG. 3.

The method 130 further receives 146 a selection of one or more data fields of the template model 16 (hereafter referred to as key data fields). The key data fields are selected so they occur consistently on test forms. For example, every HCFA form includes patient name and address data fields. When a plurality of key data fields are selected, they are selected so they are at a fixed, spatially separated distance on the form. In one embodiment, an operator of the method 130 selects the key data fields using, for example, a user input device.

For each of the key data fields, a selection of a region of the template model within which to search for the selected data field is optionally received 148. The operator of the method 130 typically selects the search region using, for example, the user input device. Insofar as no region is specified, the region is the entirety of the form. Further, a layout model is formed 150 from the template model 134. A layout model specifies the relative arrangement of the key data fields with respect to one another. Further, the layout model includes, for each of the data fields, the size of the data field and the type of text pattern the data field is expected to contain. The data fields of the layout model are data fields proximate to one another and within the search region. For example, the data fields may be name, address, city, state and zip code data fields within the search region.

A plurality of zone-candidate/data-field hypotheses mapping the candidate zones within the search region to the key data fields of the layout model are then generated 152. Each hypothesis assigns a candidate zone to a data field of the layout model or a null data field (i.e., no data field at all). In some embodiments, the hypotheses are formed exhaustively. In other words, for each combination of candidate zone and data field of the layout model, a hypothesis mapping the candidate zone to the data field is formed. Further, for each candidate zone, a hypothesis mapping the candidate zone to a null data field is formed. In other embodiments, more intelligent approaches to forming the hypotheses are employed, as known to those skilled in the art. An example is rejecting a numeric word box as a hypothesis for patient name.

For each hypothesis, a score-cost of the assignment is determined 30. For each hypothesis with a null data field, the score-cost is the sum of null costs of the constituent word boxes. The null cost of a word box is predetermined by an operator of the TFP method 10 and serves as a bias in favor of assigning candidate zones to data fields. For each hypothesis with an assignment to a data field of the layout model, the score-cost assesses the likelihood or compatibility of the assignment of the candidate zone to the data field and is based on one or more factors. The factors may include one or more of the following factors:

1) the number of characters in the word boxes of the candidate zone that are not found in a list of characters expected to occur in the data field;

2) the number of characters in the candidate zone minus the maximum number of characters expected to occur in the data field;

3) the vertical overlap proportion of the bounding boxes of the candidate zone and the corresponding data field;

4) the size similarity between the bounding boxes of the candidate zone and the corresponding data field;

5) the horizontal displacement of the lower left corners of the candidate zone and the corresponding data field;

6) the vertical displacement of the lower left corners of the candidate zone and the corresponding data field;

7) the proximity of the leftmost and rightmost word boxes of the candidate zone to word boxes not included in the candidate zone; and, 8) the density of characters in the candidate zone compared to bounding box size of the candidate zone.

In computing a score-cost for a hypothesis with an assignment to a data field of the layout model, a numeric score-cost is computed for each factor in terms of a cost. In one embodiment, a score of 0.0 indicates perfect compatibility between the candidate zone and the data field, and a score above 0.0 indicates some degree of incompatibility. The score-costs of all factors are summed, so that incompatibility of any of these factors contributes to a score-cost contraindicating the hypothesis. The summation may be weighted to favor factors better indicating incompatability.

After generating the hypotheses, an optimization search is performed 156 for a set of the hypotheses resulting in an optimal assignment of candidate zones to data fields of the template model. The set is selected on the basis of two types of constraints, a hard constraint and a soft constraint. The hard constraint, called the nonoverlapping support constraint, is that no candidate zone may be accepted in the final selection of accepted zones if any of its constituent word boxes is a member of any other accepted zone. The soft constraint is that low-score-cost assignments are preferred. The optimal assignment is the set of hypotheses that minimizes a cost function while satisfying the hard constraint.

The cost function takes in to account the sum of the score costs of the hypotheses forming the assignment. The higher the summation, the worse the match between the candidate zones and the date fields and the higher the cost. Further, the cost function takes in to account the relative positions of the candidate zones as compared to the relative positions of the corresponding data fields of the template model. For example, the larger the disparity between the relative positioning of the candidate fields compared to the relative positioning of the corresponding data fields, the higher the cost. The optimization search is suitably performed using a Best-First-Leaf-Search (BFLS) optimization algorithm. However, other algorithms can perform the optimization search, such as, for example, greedy search, A-star search, linear constraint solver, and the like.

After completing the optimization search for each of the key data fields, the location of the data corresponding to the key data fields is known. The locations of the data and the corresponding data fields can then be used to generate 158 a global registration map mapping the test image 132 to the template model 134. In other words, rigid and/or non-rigid transformations that map the test image 132 to the template model 134 are determined on the basis of the mapping between the data and the key data fields.

Figure 12:
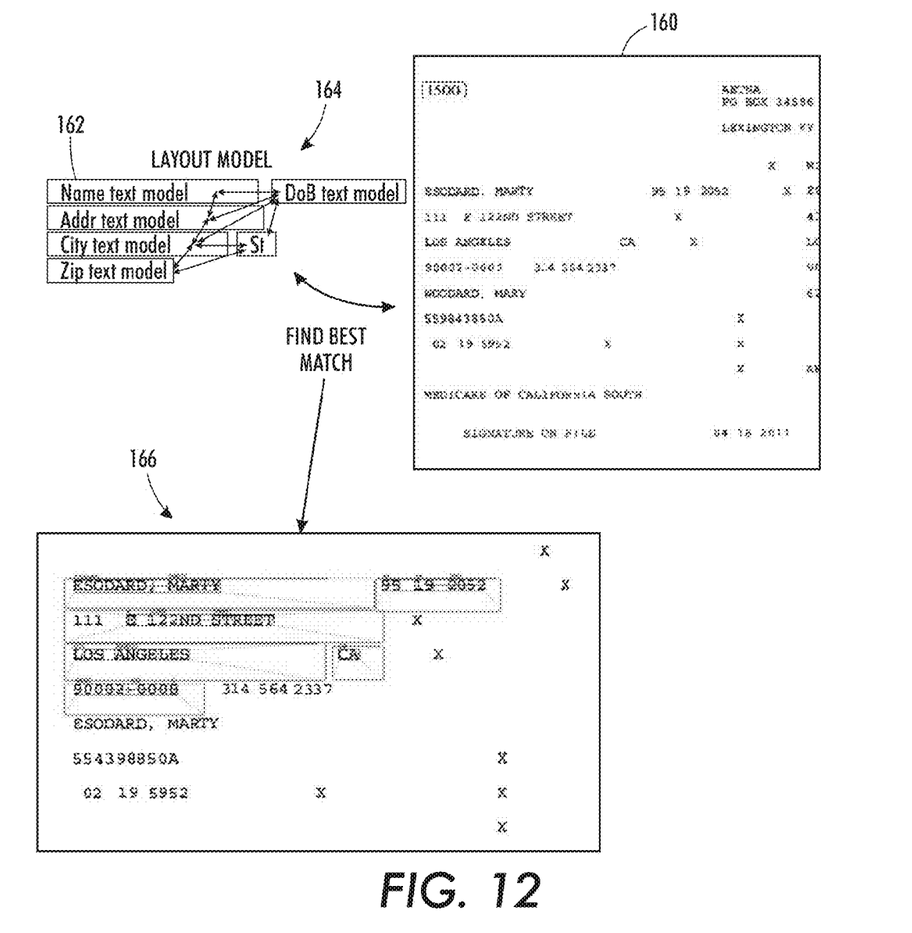
FIG. 12 illustrates localizing key data fields of a sample Health Care Finance Administration (HCFA) form.

With reference to FIG. 12, an example of localizing key data fields of a sample HCFA form 160 is illustrated. One of the key data fields is the Patient-Name data field 162. This data field 162 is found by applying a layout model 164 of the Patent-Name address block region of the form 160. The address block region consists of six fields that have a fixed spatial layout with respect to one another. The BFLS optimization algorithm accomplishes the assignment of the candidate zones 166 to these six data fields of the layout model 164. Another one of the key data fields is the Fed ID field. It is found forming a layout model of the nine data fields comprising the horizontal text line on which the FedID field resides. The BLFS optimization algorithm is then employed for assignment of the candidate zones to these nine data fields.

Figure 13:
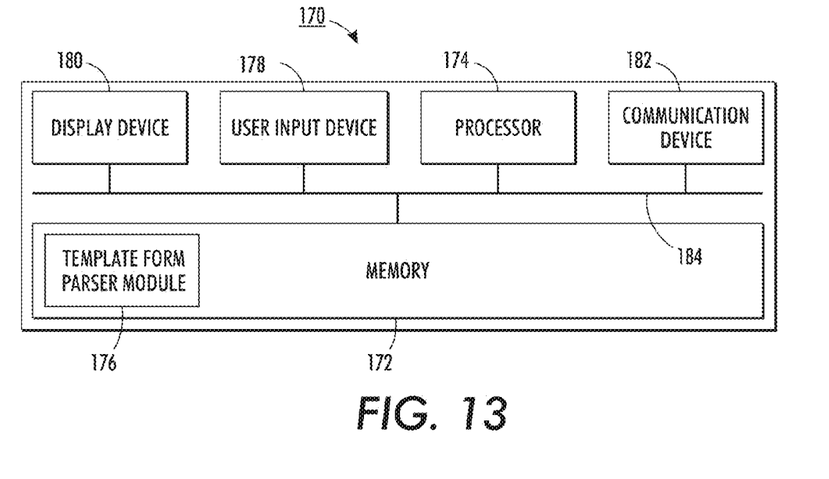
FIG. 13 illustrates a data extraction system.

With reference to FIG. 13, a data extraction system 170 includes at least one memory 172 and at least one processor 174. The memory 172 includes a TFP module 176 comprised of processor executable instructions that perform the method 10 of FIG. 3. During use of the system 170, the processor 174 executes the processor executable instructions of the TFP module 176 to perform the method 10 of FIG. 3. In this way, the processor 174 is programmed to perform the method 10 of FIG. 3.

The system 170 can further include, or be operatively connected with, one or more user input devices (e.g., mouse, keyboard, etc.) 178 for receiving user input to control the system 170. For example, the user input devices 178 can be employed to create and/or otherwise specify one or more of template models, layout models, and search regions employed by the TFP module 178. Further, the system 170 can further include, or be operatively connected with, one or more display devices 180 for displaying output generated by the system 170. An optional communication device 182 allows the system 170 to communicate with other systems, for example, over a communications network, such as the Internet, a local area network, a wide area network, and the like. At least one system buses 184 of the system 170 interconnect components thereof, such as the memory 172 and the processor 174.

Figure 14:
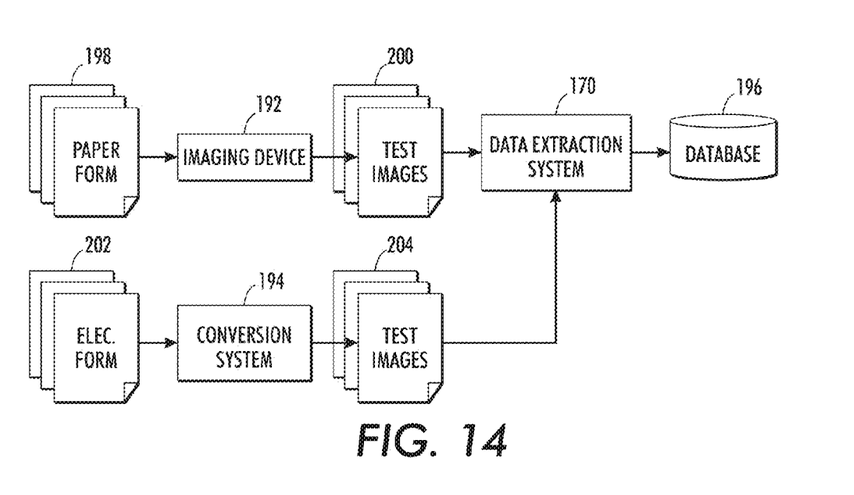
FIG. 14 illustrates a form processing system suitably employing the data extraction system of FIG. 13.

With reference to FIG. 14, a form processing system 190 employing the data extraction system 170 of FIG. 13 is illustrated. The form processing system 190 may include an imaging device 192, a conversion system 194, the data extraction system 170 of FIG. 13 and a database 196. Notably, however, the form processing system 190 may alternatively only include one of the imaging device 192 and the conversion system 194.

The imaging device 192 converts one or more paper forms 198 into test images 200. The imaging device 192 may be one or more of a camera, a scanner, and the like. In certain embodiments, the imaging device 192 may receive the paper forms 198 via a conveyor path extending from a feed tray. However, other means of receiving the paper forms 198 are equally amenable. For example, in certain embodiments, an operator of the form processing system 190 may feed the paper forms 198 to the imaging device 192. The conversion system 194 converts one or more electronic forms 202 into test images 204. Electronic forms 202 can be formatted in PDF, XML, Word, and the like. The electronic forms 202 may be loaded from a magnetic or optical media or a network.

The data extraction system 170 processes the test images 200, 204 to extract data contained therein according to the method 10 of FIG. 3. Suitably, the data extraction system 170 may receive the test images 200, 204 via a communications network, such as the Internet, a local area network, a wireless network, and the like. However, in other embodiments, the data extraction system 170 may receive the test images 200, 204 via a data bus, such as USB, Firewire, etc., a storage medium, such as a CD, a thumb drive, etc., and the like.

The database 196 stores data extracted from the test images 200, 204. Suitably, the database 196 receives the data from the data extraction system 170 via a communications network, such as the Internet, a local area network, a wireless network, and the like. In certain embodiments, the database 196 may be distributed across a plurality of computer servers interconnected by a communications network. The database 196 suitably stores the data in a table structure having fields corresponding to the fields of the forms.

As used herein, a memory includes one or more of a non-transient computer readable medium; a magnetic disk or other magnetic storage medium; an optical disk or other optical storage medium; a random access memory (RAM), read-only memory (ROM), or other electronic memory device or chip or set of operatively interconnected chips; an Internet/Intranet server from which the stored instructions may be retrieved via the Internet/Intranet or a local area network; or so forth. Further, as used herein, a processor includes one or more of a microprocessor, a microcontroller, a graphic processing unit (GPU), an application-specific integrated circuit (ASIC), an FPGA, and the like; a user input device includes one or more of a mouse, a keyboard, a touch screen display, one or more buttons, one or more switches, one or more toggles, and the like; a database includes one or more memories; and a display device includes one or more of a LCD display, an LED display, a plasma display, a projection display, a touch screen display, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for localizing data fields of a form, said method comprising:
   receiving by at least one processor an image of a form, the form including data fields;
   identifying by the at least one processor word boxes of the image;
   grouping by the at least one processor the word boxes into candidate zones, each candidate zone including one or more of the word boxes;
   forming by the at least one processor hypotheses from the data fields and the candidate zones, each hypothesis assigning one of the candidate zones to one of the data fields or a null data field; and,
   performing by the at least one processor a constrained optimization search of the hypotheses for an optimal set of hypotheses, the optimal set of hypotheses optimally assigning word boxes to corresponding data fields.

2. The method according to claim 1, wherein the form is a color-dropout form and the image is without background information of the form.

3. The method according to claim 1, wherein the identifying includes:
   whole page optical character recognizing the image to identify characters of the image; and,
   grouping the identified characters to form the word boxes.

4. The method according to claim 1, wherein the candidate zones include a candidate zone for each contiguous sequence of one or more word boxes on a common text line.

5. The method according to claim 1, wherein at least one of the word boxes lies outside nominal bounds of the associated data field.

6. The method according to claim 1, wherein the hypotheses include a hypothesis for each combination of data field and candidate zone.

7. The method according to claim 1, further including:
determining, for each of the hypotheses, an assignment quality.

8. The method according to claim 7, wherein the assignment quality for each of the hypotheses assigning a candidate zone to one of the data fields is based on text-based and layout-based comparison of the candidate zone and the data field.

9. The method according to claim 7, wherein the assignment quality for each of the hypotheses assigning a candidate zone to one of the data fields is based on a template model, the template model identifying, for each data field of the form, type of text pattern the data field is expected to contain and placement, including location and size, of the data field on the form.

10. The method according to claim 7, wherein the constrained optimization search is constrained by a hard constraint and a soft constraint, the soft constraint giving preference to sets of hypotheses with high assignment quality, and the hard constraint precluding a set of hypotheses from including overlapping word-box support of candidate zones.

11. The method according to claim 1, where constrained optimization search gives preference to sets of hypotheses which minimize unassigned word boxes.

12. The method according to claim 1, wherein the constrained optimization search is performed by a Best-First-Leaf-Search (BFLS) optimization algorithm.

13. A method for extracting data from a form, said method comprising:
the method according to claim 1; and,
extracting data from the word boxes and assigning the extracted data to corresponding data fields based on the optimal set of hypotheses.

14. A system for localizing data fields of a form, said system comprising:
at least one processor programmed to:
receive an image of a form, the form including data fields;
identify word boxes of the image;
group the word boxes into candidate zones, each candidate zone including one or more of the word boxes;
form hypotheses from the data fields and the candidate zones, each hypothesis assigning one of the candidate zones to one of the data fields or a null data field; and,
perform a constrained optimization search of the hypotheses for an optimal set of hypotheses, the optimal set of hypotheses optimally assigning word boxes to corresponding data fields.

15. The system according to claim 14, wherein the form is a color-dropout form and the image is without background information of the form.

16. The system according to claim 14, further including:
determining, for each of the hypotheses, an assignment quality.

17. The system according to claim 16, wherein the constrained optimization search is constrained by a hard constraint and a soft constraint, the soft constraint giving preference to sets of hypotheses with high assignment quality, and the hard constraint precluding a set of hypotheses from including zones that include the same word-box.

18. The system according to claim 14, wherein the constrained optimization search is performed by a Best-First-Leaf-Search (BFLS) optimization algorithm.

19. A system for extracting data from a form, said system comprising:
the system according to claim 14; and,
at least one processor programmed to:
extract data from the word boxes; and,
assign the extracted data to corresponding data fields based on the optimal set of hypotheses.

20. A data extraction system including:
at least one processor programmed to:
receive an image of a form and a template model of the form, the form including data fields;
identify word boxes of the image;
group the word boxes into candidate zones, each candidate zone including one or more of the word boxes;
form hypotheses from the data fields and the candidate zones, each hypothesis assigning one of the candidate zones to one of the data fields or a null data field;
determine, for each of the hypotheses, an assignment quality, wherein the assignment quality for each of the hypotheses assigning a candidate zone to one of the data fields is based on a template model of the form;
perform a constrained optimization search of the hypotheses for an optimal set of hypotheses based on assignment quality, the optimal set of hypotheses optimally assigning word boxes to corresponding data fields and the hypotheses of the optimal set of hypotheses being non-overlapping in word-box support; and,
extract data from the word boxes and assign the extracted data to corresponding data fields based on the optimal set of hypotheses.

* * * * *